United States Patent
Cui et al.

(10) Patent No.: US 6,910,180 B1
(45) Date of Patent: Jun. 21, 2005

(54) REMOVING COOKIES FROM WEB PAGE RESPONSE HEADERS AND STORING THE COOKIES IN A REPOSITORY FOR LATER USE

(75) Inventors: Lawrence Cui, San Jose, CA (US); Mark Vladimirovich Marchukov, Palo Alto, CA (US); Phan T. Vo, Fremont, CA (US); Anurag Mendhekar, Sunnyvale, CA (US); Mohan Vishwanath, San Jose, CA (US)

(73) Assignee: Yahoo! Inc., Santa Clara, CA (US)

( * ) Notice: Subject to any disclaimer, the term of this patent is extended or adjusted under 35 U.S.C. 154(b) by 0 days.

(21) Appl. No.: 09/309,161

(22) Filed: May 10, 1999

(51) Int. Cl.[7] .................................................. G06F 7/00
(52) U.S. Cl. ....................... 715/513; 709/203; 709/217; 709/219
(58) Field of Search .............................. 715/501.1, 513, 715/545; 709/203, 217, 219; 345/745; 707/501.1, 513

(56) References Cited

U.S. PATENT DOCUMENTS

| 5,704,029 A | * | 12/1997 | Wright, Jr. .................. 345/173 |
| 5,801,713 A | * | 9/1998 | Endo et al. .................. 345/473 |
| 6,085,224 A | * | 7/2000 | Wagner ....................... 709/203 |
| 6,256,739 B1 | * | 7/2001 | Skopp et al. ................ 709/229 |
| 6,330,566 B1 | * | 12/2001 | Durham ....................... 707/10 |
| 6,393,468 B1 | * | 5/2002 | McGee ........................ 707/513 |
| 6,397,253 B1 | * | 5/2002 | Quinlan et al. ............. 709/203 |
| 6,460,141 B1 | * | 10/2002 | Olden ......................... 713/201 |
| 6,507,911 B1 | * | 1/2003 | Langford ..................... 713/193 |

OTHER PUBLICATIONS

Wright et al, "The Erosion of Privacy", ACM, Computers and Society, 1997, pp. 22–25.*

* cited by examiner

*Primary Examiner*—Cesar B Paula
(74) *Attorney, Agent, or Firm*—Fliesler Meyer, LLP

(57) ABSTRACT

Methods and apparatus to handle cookies in a response Web page requested by a client. One method includes the steps of (a) generating a session id to identify a new session, (b) striping off any cookies set by an external web site from the response header of the response Web page, (c) appending the session id to all of the links embedded in the response page, and (d)sending the modified response page, with the new header, to the client.

14 Claims, No Drawings

REMOVING COOKIES FROM WEB PAGE RESPONSE HEADERS AND STORING THE COOKIES IN A REPOSITORY FOR LATER USE

BACKGROUND OF THE INVENTION

The present invention relates generally to a Web technology and more particularly to methods and apparatus for proxy server cookies.

Cookies have been used in the World Wide Web (Web) to track a visitor's session state. However, many browsers running on devices with limited memory capacity do not or cannot accept cookies. Also, for privacy reasons, many browsers also disable cookie handling mechanisms of their browsers. As a result, these browsers cannot access web pages that mandate cookie handling.

Thus there is a need for an alternative method to handle cookies in the Web.

SUMMARY

The present invention is on methods and apparatus that can handle cookies for devices with limited memory capacity.

In one embodiment, this is done by a server, which centralizes cookie handling for browsers on a number of clients. Not only does the invention solve the problems of browsers that cannot handle cookies, the invention also protects the privacy of surfers by hiding their identities.

DETAILED DESCRIPTION OF THE INVENTION

One embodiment of the present invention is based on the concept of dynamic session, which starts when a browser sends a fresh request to a proxy server to access information on the Web.

In the present invention, the Web is defined as a network of computers that publish information using a standard protocol, such as HTTP, FTP or TCP/IP. A dynamic session is defined as a request that the proxy server has no prior memory of.

When a new session is started, a unique session id can be generated. Within the same session, all embedded links in the response page can then be stamped with the same session id. A sessioned request is defined as a request that has session id information in addition to the request itself. The proxy server can relate a sessioned request to a session via the session id. The session continues as long as the user stays in the links of the first page or pages generated from links in the first page. A session expires when its age reaches the lifetime set by the server. The session lifetime can be configurable through a configuration parameter. Due to the dynamic nature of the session, users do not have to log into the proxy server that provides centralized cookie handling services. The same user can start multiple sessions at the same time.

In one embodiment a client sends a fresh request for a particular URL to the proxy server. The proxy server first checks the request header to determine whether the browser of the client is capable of handling cookies. If the browser accepts cookies, and if the browser does not intend to disable cookie-handling capabilities, the proxy server would not provide cookie service. Otherwise, the proxy server first generates a session id to identify the new session.

The proxy server then sends the request to the targeted external web site to get the corresponding page. After getting the response page, the proxy server first strips off any cookies set by the external web site from the response header. The cookies, owned by a particular session and identified by the session id, are typically stored in a cookie repository for subsequent requests within the session.

In one embodiment, the session id, or its encoded or encrypted version, is in a configuration of a URL, or an address the web browser recognizes.

The proxy server then appends the session id or its encoded or encrypted version to all of the links embedded in the response page. Then, the proxy server sends the modified response page, with the new header, to the corresponding client.

In one embodiment, when a sessioned request is received, the proxy first retrieves and strips off the session id from the request URL. The session id and the URL are then used to retrieve the cookies from the cookie repository. The proxy then uses the cookies retrieved to generate a cookie header. The new cookie header is then appended to the original request header. The session information is removed from the URL. The request is then sent to the external web site to fetch the page. After receiving the page from the external web site, the same procedure as that of handling a fresh request is used to process the header and the page.

What is claimed is:

1. A method to handle cookies in a response Web page requested by a client, the response Web page having a response header, the method comprising:

generating a session id to identify a new session;

stripping off any cookies set by an external web site from the response header of the response Web page and storing the cookies in a repository;

appending the session id to all of the links embedded in the response page; and sending the modified response page, with the new header, to the client.

2. A method for handling cookies for a client browser, comprising:

generating a unique session id in response to a request from a client browser;

removing any cookies from a response page for the request and storing information contained in each cookie in a cookie repository; and appending the unique session id to each URL in the response page before sending the response page to the client browser.

3. A method according to claim 2, further comprising: determining whether the client browser can accept cookies.

4. A method according to claim 2, further comprising: encrypting the session id.

5. A method according to claim 2, further comprising: checking the request for an existing session id before generating a unique session id.

6. A method according to claim 5, further comprising: retrieving a cookie from the cookie repository corresponding to the existing session id.

7. A method according to claim 6, further comprising: generating a cookie header corresponding to the retrieved cookie.

8. A method according to clam 7, further comprising: appending the cookie header to the request.

9. A method according to claim 2, further comprising: sending the request to an external Web site corresponding to the request.

10. A method according to claim 2, further comprising:
setting a lifetime for a session corresponding to the unique session id.

11. A method according to claim 10, further comprising:
storing the information from the cookie repository during the lifetime of the session.

12. A method according to claim 2, further comprising:
determining whether the client browser accepts cookies.

13. A method according to claim 2, further comprising:
receiving the request from the client browser to a proxy server, the proxy server hosting the cookie repository.

14. A method to handle cookies in a response Web page requested by a client, the response Web page having a response header, the method comprising:

generating a session id to identify a new session;

stripping off any cookies set by an external web site from the response header of the response Web page at a proxy server;

appending the session id to all of the links embedded in the response page;

sending the modified response page, with the new header, to the client;

receiving a page request for one of the links from the client;

at the proxy server, using the appended session id to construct a cookie header;

adding the cookies header to the page request.

* * * * *